No. 655,004. Patented July 31, 1900.
S. L. PENFIELD.
CONTACT GONIOMETER.
(Application filed Apr. 2, 1900.)
(No Model.)
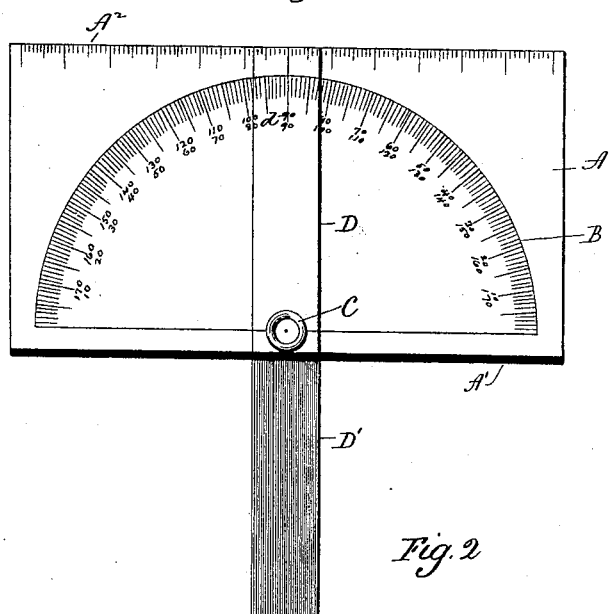

UNITED STATES PATENT OFFICE.

SAMUEL LEWIS PENFIELD, OF NEW HAVEN, CONNECTICUT.

CONTACT-GONIOMETER.

SPECIFICATION forming part of Letters Patent No. 655,004, dated July 31, 1900.

Application filed April 2, 1900. Serial No. 11,048. (No model.)

*To all whom it may concern:*

Be it known that I, SAMUEL LEWIS PENFIELD, of New Haven, in the county of New Haven and State of Connecticut, have invented a new Improvement in Contact-Goniometers, (Case A;) and I do hereby declare the following, when taken in connection with the accompanying drawings and the letters of reference marked thereon, to be a full, clear, and exact description of the same, and which said drawings constitute part of this specification, and represent, in—

Figure 1, a plan view of a contact-goniometer constructed in accordance with my invention; Fig. 2, a detached view of the measuring-arm.

This invention relates to an improvement in that class of instruments employed in crystallography for the measurement of the interfacial angles of crystals and called "contact-goniometers," the object of the invention being to produce at a very low cost for manufacture a simple, durable, and accurate instrument constructed with particular reference to cheapness of production and convenience in use and adapted also to be used as a protractor.

With these ends in view my invention consists in a measuring instrument comprising a card provided with a divided semicircle and having a base-line and a measuring-arm swiveled directly upon the card at the center of the said semicircle and having a transparent indicating end provided with an indicating-line arranged so that if projected it would intersect the center upon which the arm swings.

My invention further consists in certain details of construction and combinations of parts, as will be hereinafter described, and pointed out in the claims.

In carrying out my invention as herein shown I employ a cardboard card A, upon which a divided semicircle B is printed by means of an accurately-engraved plate. Directly upon this card I swivel a measuring-arm, comprising an indicating end D and a measuring end D', by means of an eyelet C, located so that its center will exactly coincide with the true center of the semicircle B. As shown, the measuring-arm is made from a single piece of transparent celluloid, through which the divisions of the semicircle B are easily and accurately read. The outer extremity of the indicating end D of the said measuring-arm I form with an indicating-line $d$, located so that if it were projected it would accurately intersect the very center of the eyelet C, and therefore the very center of the divided semicircle B. The measuring end D' of the arm is by preference made opaque by coating it over with paint or some opaque material. The inner edge of the card is made straight to form a base-line A', which is preferably blackened to assist the user of the instrument in accurately adjusting it to the faces of the crystal to be measured, which is also the purpose of applying an opaque coating to the measuring end of the measuring-arm.

It will be readily understood by persons familiar with the use of instruments of this class that in using my improved instrument the base-line of the card and one of the two edges of the measuring end of the swiveled measuring-arm are brought into contact with the faces of the crystal, the plane of the card being kept as nearly as possible at a right angle to the edge formed by the intersection of these faces. The angle is then read on the divided semicircle B through the transparent indicating end of the measuring-arm and by means of the indicating-line scratched or drawn upon the said arm.

It is not essential that the card A should be made of cardboard, as it might, if preferred, consist of a plate or sheet of celluloid or any other material on which it would be convenient and practicable to place a divided semicircle. Nor is it essential that the measuring-arm should be made of a strip of transparent celluloid, though that material being non-breakable and cheap is well adapted for the purpose, particularly as it affords convenient means for securing a transparent indicating end for the measuring-arm; but that might be secured in some other way, as by affixing a piece of celluloid or glass to an arm made of an opaque material. Nor do I limit myself to swiveling the arm upon the card in any particular way. As shown, the outer edge of the card is graduated, as at $A^2$, to enable it to be used as a scale.

My improved instrument may also be used to take the place of the protractors ordinarily used in mechanical drawing. In using the instrument for this purpose the measuring-arm is swung until the indicating-line of its indicating end coincides with the desired degree-line in the divided semicircle. At this time the measuring end of the arm will stand at the required angle to the base-line of the card. The base-line of the card is then placed upon the base-line of the drawing being worked upon so as to exactly coincide therewith, and a line is drawn with a pencil on one side or the other of the measuring end of the arm. The line thus drawn will stand at exactly the desired angle to the base-line of the drawing and exactly correspond to the angle recorded on the card. My improved device may thus be used as a protractor. If desired to use the device as a protractor exclusively, I should by preference make it somewhat larger in size than when designed to be used mainly as a goniometer and make the measuring-arm transparent through its length. It is thought to be unnecessary to illustrate this construction, as it would be just like the construction shown except larger and except for not coating one end of the measuring-arm with an opaque film of paint or other material. The protractor so made might then be used as a goniometer, but would not, perhaps, be quite as convenient as when made as shown and described.

Having fully described my invention, what I claim as new, and desire to secure by Letters Patent, is—

1. A measuring instrument, comprising a card provided with a divided semicircle, and having a base-line, and a measuring-arm swiveled directly to the card at the center of the said semicircle, and having an indicating end of transparent material, provided with an indicating-line arranged so that if projected it would intersect the center of the swivel by means of which the arm is directly attached to the card.

2. A contact-goniometer, comprising a card provided with a divided semicircle, and having a base-line, and a measuring-arm swiveled directly to the card at the center of the said semicircle, and having a measuring end and an indicating end, the latter being made of transparent material, and provided with an indicating-line arranged so that if projected it would intersect the center of the swivel by means of which the arm is directly attached to the card.

3. A contact-goniometer, comprising a card provided with a divided semicircle and having a base-line, and a measuring-arm swiveled directly to the said card at the center of the said semicircle, and having a transparent indicating end and an opaque measuring end, its transparent indicating end being furnished with an indicating-line, which, if projected, would intersect the center of the swivel by means of which the arm is directly attached to the card.

4. A contact-goniometer, comprising a card provided with a divided semicircle, and having a base-line, and a celluloid measuring-arm swiveled to the card at the center of the said semicircle, and having its indicating end transparent and provided with an indicating-line, and having its measuring end opaque for use in conjunction with the base-line of the card.

In testimony whereof I have signed this specification in the presence of two subscribing witnesses.

SAMUEL LEWIS PENFIELD.

Witnesses:
FRED. C. EARLE,
GEORGE D. SEYMOUR.